July 11, 1961 J. C. EVRAETS 2,992,287

THERMOPILE CONSTRUCTION AND METHOD

Filed Oct. 17, 1957 2 Sheets-Sheet 1

INVENTOR.
John C. Evraets.
BY
[signature]
ATTORNEY.

THERMOPILE CONSTRUCTION AND METHOD

Filed Oct. 17, 1957 2 Sheets-Sheet 2

INVENTOR.
John C. Evraets.
BY
[signature]
ATTORNEY.

United States Patent Office 2,992,287

Patented July 11, 1961

2,992,287

THERMOPILE CONSTRUCTION AND METHOD

John C. Evraets, Los Angeles, Calif., assignor to Robertshaw-Fulton Controls Company, Richmond, Va., a corporation of Delaware Filed Oct. 17, 1957, Ser. No. 690,751
6 Claims. (Cl. 136—4)

This invention relates to thermopiles and more particularly to a method of constructing the same.

A simple thermocouple is formed with two wires of dissimilar metals each having two junctions. When one of the junctions is kept at a temperature above that of the other, there is a voltage generated as a result of the temperature difference. Generally, a much larger voltage than that generated by a thermocouple is desired. One method of supplying a larger voltage is by the connection of a plurality of thermocouples in a series which is commonly referred to as a thermopile. However, production of thermopiles is very tedious and time consuming resulting in high production costs.

Therefore, it is an object of this invention to construct a thermopile by a simple, inexpensive method which requires a minimum of hand or non-automatic operations.

It is another object of this invention to reduce thermopile insulating problems to a minimum.

In the preferred embodiment of this invention, a plurality of grooves are formed in the ends of a core member. A wire of an appropriate thermoelectric material is looped around one of the projections formed on the end by the end grooves and then looped around a projection on the other end. This process of looping the thermoelectric material around projections on opposite ends is carried on for the desired number of couples. A second wire having dissimilar thermoelectric characteristics is alternately looped around the end projections similarly to the first material but on the other side of the core member. The overlapping portions of the wires in the end grooves are then connected and a portion of each wire loop around the projection is removed thereby forming a plurality of thermocouples connected in series.

Other objects and advantages of this invention will become apparent from the following detailed description taken in connection with the accompanying drawings wherein.

Figure 1:
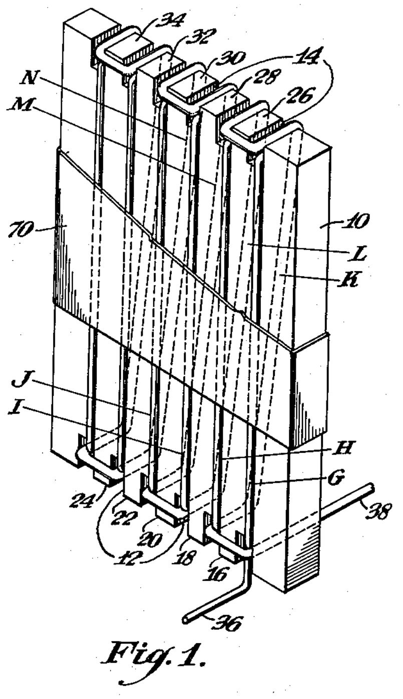
FIG. 1 is a perspective view of the thermopile construction.
Figure 3:
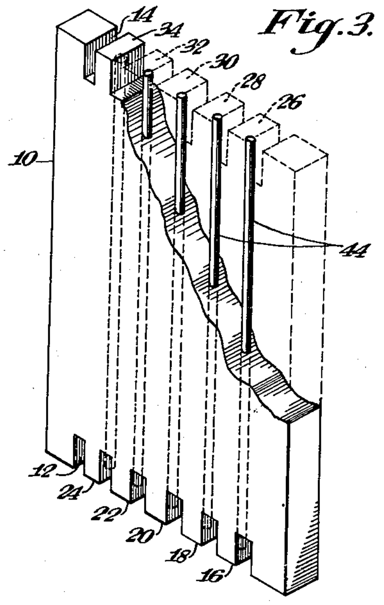
Figures 7, 8:
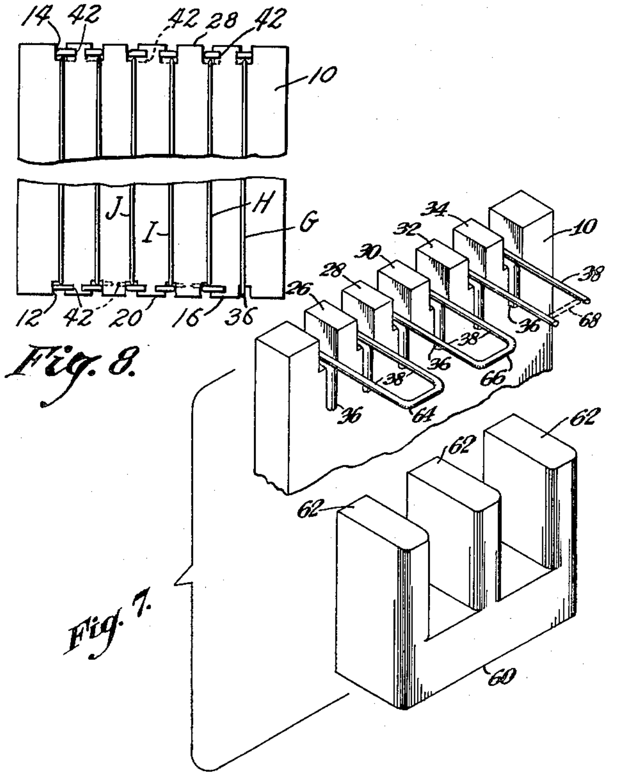
Figure 9:
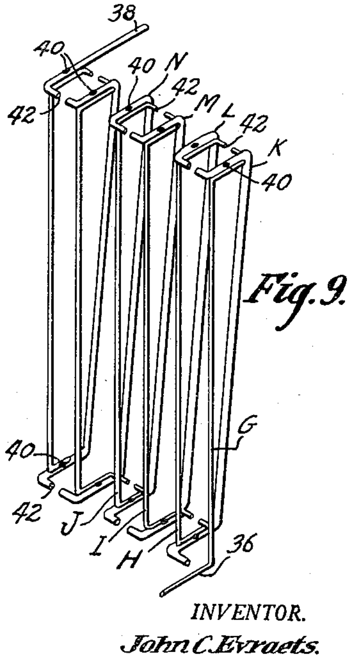

FIGS. 3, 4, 5, and 6 are perspective views of various forms of the core member;

FIG. 7 is a perspective view of a modified thermopile construction with a jig in detached position; and FIG. 8 is a broken front elevation of the thermopile of FIG. 1; and FIG. 9 is a perspective view of the thermopile construction with the core removed.

Referring more particularly to FIG. 1, a rectangular core member 10 of an appropriate material hereinafter described and having a plurality of grooves 12 in one end and a plurality of grooves 14 in the other end is formed by machining, stamping, casting or some similar method. The grooves 12 and 14 define a plurality of projections 16, 18, 20, 22, 24, and 26, 28, 30, 32, 34, respectively on the ends of core member 10.

An appropriate thermoelectric material 36, such as a material of the constantan group in the form of a strip, round wire, or square wire, is started upward, as viewed in FIG. 1, at G, looped around projection 26, comes downward at H, is looped around projection 18, goes upward again at I, and is looped around projection 30, and comes downward again at J, and continues in this manner depending upon the desired number of couples. Then another appropriate thermoelectric material 38, such as a chromium alloy, having different thermoelectric characteristics than material 36 is started in one of the grooves 12, looped around projections 16, and comes upward diagonally at K on the other side of the core member 10 and is looped around projection 26 thereby overlapping thermoelectric material 36 in groove 14. The thermoelectric material 38 continues downwardly at L and is looped around projection 20 thereby overlapping material 36 in the grooves 12 and goes upwardly diagonally on the other side of the core member 10 at M. Thermoelectric material 38 is then looped around projection 30 thereby overlapping material 36 in the grooves 14 and comes downward at N and is looped around projection 24. This process may also continue for the desired number of couples. It should be noted that the material 36 forms a plurality of strips on one side of core member 10 which communicate with directly opposed grooves 12 and 14 while material 38 forms a plurality of parallel strips on the other side of core member 10 which do not communicate with directly opposed grooves 12 and 14 but are diagonally connected to the grooves 12, 14.

Figure 2:
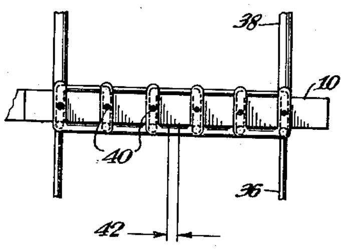
FIG. 2 is a plan view of the thermopile construction of FIG. 1.
Figure 4:
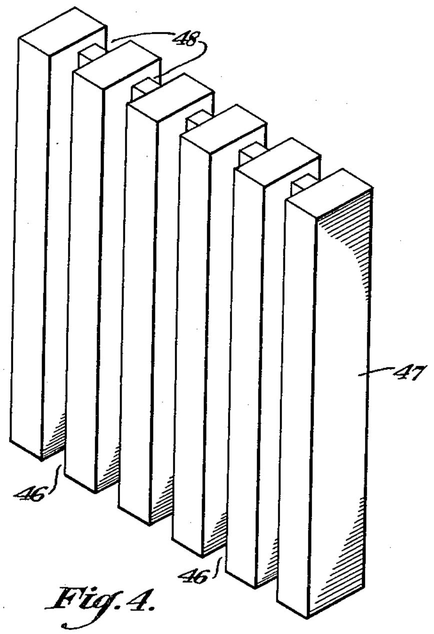
Figure 5:
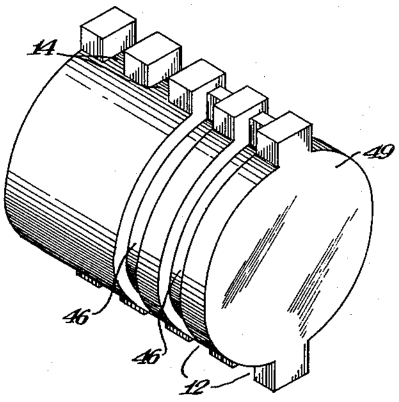
Figure 6:
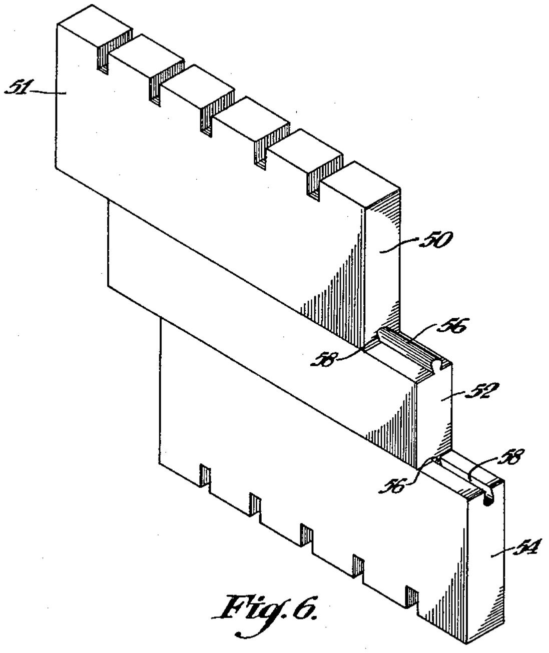

The overlapping materials 36 and 38 in the grooves 12 and 14 are connected by any acceptable means, such as welds 40 (FIG. 2). A convenient method is to place the sides of the assembly shown in FIG. 1 in a clamp which is one side of a circuit of an electric welder. Thermoelectric materials 36, 38 form an electricity conducting path to the points that are to be welded. The movable electrode of the welder is then applied at the material crossing in the grooves 12 and 14 causing welds 40, such as indicated in FIG. 2.

The loops of materials 36 and 38 that extend around projections 16, 20, 24, and 26, 30, 34 between the welds 40 are removed by grinding, cutting, shearing, snipping or any other similar means. The whole loops are not necessarily removed, since the removal of a portion indicated at 42 in FIG. 2 will be sufficient to deter the flow of electricity.

It will now become apparent that the unit is a plurality of thermocouples connected in series on an insulating core member. The series wound thermopile would be upward through G, down through K, up through H, down through L, up through I, down through M and so on. One end of material 36 will be connected to a lead of an appropriate circuit and the opposite end of material 38 will be connected to the other lead of the circuit. The remaining ends of materials 36 and 38 will be cut off at a point adjacent to welds 40.

Initial selection of a core member 10 with proper insulating characteristics would depend on many different factors, for example, the method of forming the core member 10, the final desired shape, the size of the thermopile elements, or the temperature limitations determined by the use in which the finished pile is employed. Rubber, Bakelite, plastic, ceramic, metal with an oxide covering (such as anodized aluminum), and mica are a few of the more commonly used core materials. When the dimensions are small and the core material is structurally weak, as in the case of ceramic, reinforcing rods 44 (FIG. 3) may be embedded in the core member to alleviate the weakness. The reinforcing rods 44 extend into the projections 16, 18, 20, 22, 24, and 26, 28, 30, 32, 34 to prevent breaking of the same.

While the core member 10 prevents transfer of heat between the thermal elements on either side of the core member 10, it is also desirable to limit the heat transfer between the thermal elements on the same side of the core member 10. To this effect, one side of a core member 47 (FIG. 4) is provided with a plurality of parallel grooves 46 in which the thermoelectric material 36 is placed. A plurality of parallel grooves 48 are provided in the opposite side of core member 47 (FIG. 4) at an angle to the grooves 46 to accommodate the thermoelectric material 38. It is readily apparent that the situation of the materials 36, 38 in the parallel grooves make them less susceptible to the heat of adjacent parallel strips. The depth of the grooves 46, 48 is the determining factor as to the effectiveness of the insulation.

Should space limitations preclude the use of a flat core member, the core member 49 (FIG. 5) may be employed. The core member 49 (FIG. 5) may be provided with end grooves 12 and 14 only, as shown on the left portion, or the grooves 46 and 48, similar to FIG. 4, may be added for better insulation as shown on the right portion. It should be understood that the thermopile will be constructed on all the core members in a manner similar to that described in FIG. 1.

When a thermopile is required without a core member, the core member 51 (FIG. 6) may be constructed in a plurality of pieces 50, 52, 54 connected by a conventional tongue 56 and groove 58. After the thermopile has been constructed on the core member 51, middle section 52 may be removed first, thereby permitting the removal of sections 50, 54. The tongue and groove connection is merely illustrative of the many connections that may be employed.

It has been discovered that a piece of material extended from the hot or cold junctions will increase the efficiency of a thermocouple. Such extension tips on the cold junctions facilitate the dissipation of the heat to the surrounding air, thereby cooling the junction. When placed on the hot junctions, the extension tips become heated and thereby reduce the heat that is available to be conducted down the thermal element to the cold junction. In either case, the temperature differential is increased.

To construct a thermopile with these extension tips, the jig 60 having projections 62 thereon for alignment with the extensions 26, 30, and 34 of the core member 10 (FIG. 7) is placed against the parallel strips of thermoelectric material 36 that has already been wound around core member projections 26, 30, and 34. Thermoelectric material 38 is then wound in the manner similar to that previously described except that it is looped around projections 26, 30, and 34 and their respective aligned projections 62, instead of being looped around the projections 26, 30, 34 alone. After the welding or a similar connecting operation, the jig 60 is detached by moving it downward leaving loops 64, 66, and 68. The loops 64, 66, and 68 are then cut leaving extension tips on the junctions as shown in the full line positions of the cut loop 68. The extension tips then may be bent into axial alignment with projections 26, 28, 30, 32, and 34 or any other position consistent with the space limitations.

Any one of the completed units above described can be further insulated if so desired by providing a covering 70 (FIG. 1). For example, if the core member were of plastic or ceramic, the completed unit could be placed in a mold and more material poured over and around the outside to insulate as desired. If the core member were of rubber, sheets of rubber could be placed on the outside and the unit vulcanized together. Alternatively, the unit may merely be covered with mica sheet or glass.

While various embodiments have been shown and described, it should be understood that various structural and procedural changes may be made without departing from the scope of this invention as defined in the appended claims.

I claim:

1. A thermopile comprising a core of insulating material having two series of spaced projections thereon extending from opposite sides of said core, a plurality of thermocouple elements supported on said core, each said element having a pair of wire-like members of dissimilar thermoelectric material with longitudinally extending portions arranged diagonally with respect to each other on opposite sides of said spaced projections, said members each having reversely bent transversely extending portions at either end of said longitudinal portions, said transverse portions of one said element each having a terminal end hooked around individual ones of said projections respectively, said transverse portions being in overlapping relation, and means for securing said related transverse portions to each other in said overlapping relation.

2. A thermopile as claimed in claim 1 wherein said core is rectangular and said projections extend from opposite ends thereof.

3. A thermopile as claimed in claim 1 wherein said core is cylindrical and said projections extend from diametrically opposite sides thereof.

4. A thermopile as claimed in claim 1 wherein said core is collapsible and said wire-like members have sufficient rigidity for making said thermocouple elements self-sustaining upon removal of said core.

5. The method of making a thermopile having a plurality of thermocouple elements with uniform spaced junctions connected in series, comprising winding longitudinally extending portions of a pair of wire-like members of dissimilar thermoelectric material diagonally with respect to each other and in different planes, bending portions at either end of said longitudinal portions transversely of said longitudinal portions and reversely to each other whereby portions of said members of dissimilar material lie in overlapping relation at said either end, securing said overlapped portions of the transversely bent portions to each other in said overlapping relation, and severing said reversely bent portions between said overlapped portions leaving said uniform spaced junctions therebetween.

6. The method of making a thermopile having a plurality of thermocouple elements with uniform spaced junctions connected in series, comprising forming a core member with two series of spaced projections on opposite sides thereof, winding longitudinally extending portions of a pair of wire-like members of dissimilar thermoelectric material diagonally with respect to each other on opposite sides of said spaced projections, bending portions at either end of said longitudinal portions reversely to each other around individual ones of said projections and transversely of said longitudinal portions whereby portions of said members of dissimilar material lie in overlapping relation at said either end, securing said overlapped portions of the transversely bent portions to each other in said overlapping relation, and severing said reversely bent portions between said overlapped portions leaving said uniform spaced junctions therebetween.

References Cited in the file of this patent

UNITED STATES PATENTS

| | | |
|---|---|---|
| 1,357,850 | Derr | Nov. 2, 1920 |
| 1,648,700 | Simonds | Nov. 8, 1927 |
| 2,310,026 | Higley | Feb. 2, 1943 |
| 2,653,178 | Ruffle | Sept. 22, 1953 |
| 2,674,641 | Holmes | Apr. 6, 1954 |
| 2,807,657 | Jenkins et al. | Sept. 24, 1957 |